United States Patent
Suganuma et al.

(10) Patent No.: US 12,517,387 B2
(45) Date of Patent: Jan. 6, 2026

(54) INSPECTION METHOD, INSPECTION DEVICE, MANUFACTURING METHOD, AND MANUFACTURING DEVICE FOR OPTICAL WAVELENGTH CONVERSION SHEET, OPTICAL WAVELENGTH CONVERSION SHEET, BACKLIGHT DEVICE, LIQUID CRYSTAL PANEL, AND LIQUID CRYSTAL DISPLAY DEVICE

(71) Applicant: FUJIFILM Corporation, Tokyo (JP)

(72) Inventors: Takashi Suganuma, Kanagawa (JP); Masakazu Takematsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 137 days.

(21) Appl. No.: 18/474,832

(22) Filed: Sep. 26, 2023

(65) Prior Publication Data

US 2024/0019724 A1    Jan. 18, 2024

Related U.S. Application Data

(63) Continuation of application No. PCT/JP2022/014917, filed on Mar. 28, 2022.

(30) Foreign Application Priority Data

Mar. 29, 2021 (JP) .................. 2021-055625
Feb. 14, 2022 (JP) .................. 2022-020273

(51) Int. Cl.
*G02F 1/13*    (2006.01)
*G01M 11/02*   (2006.01)
(Continued)

(52) U.S. Cl.
CPC ........... *G02F 1/1309* (2013.01); *G01M 11/02* (2013.01); *G01N 21/8806* (2013.01);
(Continued)

(58) Field of Classification Search
CPC ............ G01N 21/8806; G01N 21/892; G01N 21/95692; G01N 2021/8845;
(Continued)

(56) References Cited

U.S. PATENT DOCUMENTS

2003/0075687 A1   4/2003   Suzuki et al.
2009/0244527 A1   10/2009  Li et al.
(Continued)

FOREIGN PATENT DOCUMENTS

JP   2003-130801 A   5/2003
JP   2009-175150 A   8/2009
(Continued)

OTHER PUBLICATIONS

International Search Report issued in PCT/JP2022/014917 on Jun. 14, 2022.
(Continued)

*Primary Examiner* — Kevin K Pyo
(74) *Attorney, Agent, or Firm* — Edwards Neils LLC; Jean C. Edwards, Esq.

(57) ABSTRACT

An inspection is performed using a captured image obtained by irradiating, with blue light, an optical wavelength conversion sheet that includes a quantum dot layer which contains a quantum dot emitting red light and green light by receiving blue light with blue light from a back surface side and imaging from a front surface side with a camera. A filter which cuts the blue light and transmits the red light and the green light is disposed between the camera and the optical wavelength conversion sheet.

19 Claims, 10 Drawing Sheets

(51) Int. Cl.
  *G01N 21/88* (2006.01)
  *G01N 21/892* (2006.01)
  *G01N 21/956* (2006.01)
  *G02F 1/13357* (2006.01)
  *G01N 21/95* (2006.01)

(52) U.S. Cl.
  CPC ..... *G01N 21/892* (2013.01); *G01N 21/95692* (2013.01); *G02F 1/133602* (2013.01); *G01N 2021/8845* (2013.01); *G01N 2021/9513* (2013.01)

(58) Field of Classification Search
  CPC .......... G01N 2021/9513; G02F 1/1309; G02F 1/133602; G01M 11/02
  See application file for complete search history.

(56) References Cited

U.S. PATENT DOCUMENTS

2016/0349573 A1* 12/2016 Ohmuro ................ G02F 1/1336
  2018/0072949 A1   3/2018 Satake et al.

FOREIGN PATENT DOCUMENTS

| JP | 2015-138031 A | 7/2015 |
| JP | 2019-007951 A | 1/2019 |
| JP | 2019-052868 A | 4/2019 |
| KR | 10-2015-0134043 A | 12/2015 |
| WO | 2016/194351 A1 | 12/2016 |

OTHER PUBLICATIONS

Written Opinion issued in PCT/JP2022/014917 on Jun. 14, 2022.
International Preliminary Report on Patentability completed by WIPO on Oct. 3, 2023 in connection with International Patent Application No. PCT/JP2022/014917.
Office Action, which was issued by the Korean Intellectual Property Office on Sep. 11, 2025, in connection with Korean Patent Application No. 10-2023-7032880.

* cited by examiner

FIG. 13

| OPTICAL WAVELENGTH CONVERSION SHEET | EVALUATION | | | | | | |
|---|---|---|---|---|---|---|---|
| | PRIMARY INSPECTION DEVICE | | | SECONDARY INSPECTION DEVICE | | | |
| | DETECTABILITY | BRIGHTNESS AND DARKNESS OF DEFECTS | NOISE | DETECTABILITY | BRIGHTNESS AND DARKNESS OF DEFECTS | NOISE |
| TWO-LAYER STRUCTURE | A | A | A | B | B | B |
| THREE-LAYER STRUCTURE | A | A | A | B | B | C |
| FOUR-LAYER STRUCTURE | A | A | A | C | C | D |
| FIVE-LAYER STRUCTURE | A | A | B | C | C | D |

FIG. 15

| CAPTURED IMAGE + DETECTION PORTION | START CONDITION | THRESHOLD VALUE-CHANGED CONDITION | THRESHOLD VALUE-CHANGED + IMAGE-PROCESSED CONDITION |
|---|---|---|---|
| SIZE OF DEFECT [μm] | 200 | 300 | 468 |
| THRESHOLD VALUE FOR BLACK (%) | 85 | 93 | 93 |
| IMAGE PROCESSING | ONLY STANDARD | ONLY STANDARD | STANDARD + EXPANSION PROCESSING + CONTRACTION PROCESSING |

INSPECTION METHOD, INSPECTION DEVICE, MANUFACTURING METHOD, AND MANUFACTURING DEVICE FOR OPTICAL WAVELENGTH CONVERSION SHEET, OPTICAL WAVELENGTH CONVERSION SHEET, BACKLIGHT DEVICE, LIQUID CRYSTAL PANEL, AND LIQUID CRYSTAL DISPLAY DEVICE

CROSS-REFERENCE TO RELATED APPLICATIONS

This application is a Continuation of PCT International Application No. PCT/JP2022/014917 filed on 28 Mar. 2022, which was published under PCT Article 21 (2) in Japanese, and which claims priority under 35 U.S.C § 119 (a) to Japanese Patent Applications No. 2021-055625 filed on 29 Mar. 2021 and No. 2022-020273 filed on 14 Feb. 2022. The above applications are hereby expressly incorporated by reference, in their entirety, into the present application.

BACKGROUND OF THE INVENTION

1. Field of the Invention

The present invention relates to an inspection method, an inspection device, a manufacturing method, and a manufacturing device for an optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range; an optical wavelength conversion sheet; a backlight device; a liquid crystal panel; and a liquid crystal display device.

2. Description of the Related Art

As an optical wavelength converter which emits, by receiving light in a first wavelength range, light in a second wavelength range having a peak wavelength different from a peak wavelength of the light in the first wavelength range, a quantum dot (also called QD, quantum dots, and the like) has been known. The quantum dot is used in, for example, a backlight unit of a liquid crystal display device as an optical wavelength conversion sheet having a quantum dot layer (optical wavelength conversion layer) containing the quantum dot. In a case of being used as the backlight unit of the liquid crystal display device, for example, an optical wavelength conversion sheet that contains a quantum dot which receives blue light (light in a first wavelength range) and emits red light (light in a second wavelength range) and a quantum dot which receives the blue light and emits green light (light in a second wavelength range) is illuminated with blue illumination light from a rear surface side. As a result, white light including blue of the illumination light, and red and green generated by converting the wavelength of the illumination light is obtained.

In addition, as an inspection method for an optical wavelength conversion sheet containing a phosphor as a wavelength converter, JP2019-052868A has been known. In JP2019-052868A, an optical wavelength conversion sheet containing two types of phosphors (optical wavelength converters) is irradiated with excitation light, and an inspection is performed by selectively receiving light in a wavelength range in which a difference in luminescence intensity of fluorescence from the two types of phosphors, generated by the excitation light, is 25% more.

SUMMARY OF THE INVENTION

However, in JP2019-052868A, for example, in a case of inspecting an optical wavelength conversion sheet containing three types of phosphors, such as a phosphor which emits blue light with excitation light, a phosphor which emits red light with excitation light, and a phosphor which emits green light with excitation light, there is a problem that it is necessary to perform an inspection for each type of the optical wavelength converters, such as an inspection by receiving blue light, an inspection by receiving red light, and an inspection by receiving green light, which takes time and effort.

In addition, in order to prevent such a problem, in a case where an inspection is performed by receiving white light including blue light, red light, and green light (inspection of blue light, red light, and green light collectively), there is a problem that inspection accuracy is lowered. In particular, in a case where each color of light is generated differently, such as the optical wavelength conversion sheet of the backlight unit that generates white light including the illumination light (for example, blue light) and the light generated by receiving the illumination light (for example, red light and green light), accurate inspection results cannot be obtained even in a case where each color is inspected under the same conditions.

The present invention has been made in view of the above-described background, and an object of the present invention is to provide an inspection method, an inspection device, a manufacturing method, and a manufacturing device for an optical wavelength conversion sheet; an optical wavelength conversion sheet; a backlight device; a liquid crystal panel; and a liquid crystal display device, in which inspection accuracy can be improved without taking time and effort.

In order to achieve the above-described object, in the inspection method for an optical wavelength conversion sheet according to an aspect of the present invention, the optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the inspection method includes an irradiating step of irradiating a back surface of the optical wavelength conversion sheet with illumination light including the light in the first wavelength range; an imaging step of imaging an optical wavelength conversion sheet from a front surface side of the optical wavelength conversion sheet; and an imaging wavelength selection step of separating, between the irradiating step and the imaging step, the light in the first wavelength range and light in a wavelength range other than the first wavelength range, selecting the light in a wavelength range other than the first wavelength range as light for imaging, and emitting the light toward the imaging step.

A plurality of storage chambers may be formed in the optical wavelength conversion layer by partitioning the optical wavelength conversion layer with a partition wall perpendicular to a layer surface, and the optical wavelength converters may be enclosed in each of the storage chambers.

In the optical wavelength conversion sheet, a support layer may be provided on a back surface side of the optical wavelength conversion layer.

A back surface of the support layer may be covered and protected by a back surface protective film.

In the optical wavelength conversion sheet, a transparent optical layer may be provided on a front surface side of the optical wavelength conversion layer.

A front surface of the optical layer may be covered and protected by a front surface protective film.

The first wavelength range may be included in a visible light wavelength range.

The inspection method for an optical wavelength conversion sheet according to the aspect of the present invention may include a primary inspection step including the irradiating step, the imaging step, and the imaging wavelength selection step; and a secondary inspection step including a secondary irradiating step of irradiating the back surface of the optical wavelength conversion sheet with illumination light including the light in the first wavelength range and the light in the second wavelength range, and a secondary imaging step of imaging the optical wavelength conversion sheet from the front surface side of the optical wavelength conversion sheet.

The inspection method for an optical wavelength conversion sheet according to the aspect of the present invention may include a comparison step of comparing a primary captured image imaged in the primary inspection step and a secondary captured image imaged in the secondary inspection step.

In addition, in order to achieve the above-described object, in the inspection device for an optical wavelength conversion sheet according to an aspect of the present invention, the optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the inspection device includes an irradiation mechanism for irradiating a back surface of the optical wavelength conversion sheet with illumination light including the light in the first wavelength range; an imaging mechanism for imaging an optical wavelength conversion sheet from a front surface side of the optical wavelength conversion sheet; and an imaging wavelength selection mechanism for separating, in the optical wavelength conversion sheet and the imaging mechanism, the light in the first wavelength range and light in a wavelength range other than the first wavelength range, and selecting the light in a wavelength range other than the first wavelength range as light for imaging and emitting the light toward the imaging mechanism.

In addition, in order to achieve the above-described object, in the manufacturing method for an optical wavelength conversion sheet according to an aspect of the present invention, the optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the manufacturing method includes a forming step of forming the optical wavelength conversion layer; and an inspection step of inspecting an optical wavelength conversion sheet on which the optical wavelength conversion layer is formed, in which the inspection step an irradiating step of irradiating a back surface of the optical wavelength conversion sheet with illumination light including the light in the first wavelength range, an imaging step of imaging an optical wavelength conversion sheet from a front surface side of the optical wavelength conversion sheet, and an imaging wavelength selection step of separating, between the irradiating step and the imaging step, the light in the first wavelength range and light in a wavelength range other than the first wavelength range, and selecting the light in a wavelength range other than the first wavelength range as light for imaging and emitting the light toward the imaging step.

In addition, in order to achieve the above-described object, in the manufacturing device for an optical wavelength conversion sheet according to an aspect of the present invention, the optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the manufacturing device includes a forming device for forming the optical wavelength conversion layer; and an inspection device for inspecting an optical wavelength conversion sheet on which the optical wavelength conversion layer is formed, in which the inspection device includes an irradiation mechanism for irradiating a back surface of the optical wavelength conversion sheet with illumination light including the light in the first wavelength range, an imaging mechanism for imaging an optical wavelength conversion sheet from a front surface side of the optical wavelength conversion sheet, and an imaging wavelength selection mechanism for separating, in the optical wavelength conversion sheet and the imaging mechanism, the light in the first wavelength range and light in a wavelength range other than the first wavelength range, and selecting the light in a wavelength range other than the first wavelength range as light for imaging and emitting the light toward the imaging mechanism.

In addition, in the manufacturing method for an optical wavelength conversion sheet according to an aspect of the present invention, the optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the manufacturing method includes a forming step of forming the optical wavelength conversion layer; an inspection step of inspecting an optical wavelength conversion sheet on which the optical wavelength conversion layer is formed; and a removal step of removing a defective portion detected in the inspection step from a portion used as a product, in which the inspection step an irradiating step of irradiating a back surface of the optical wavelength conversion sheet with illumination light including the light in the first wavelength range, an imaging step of imaging an optical wavelength conversion sheet from a front surface side of the optical wavelength conversion sheet, an imaging wavelength selection step of separating, between the irradiating step and the imaging step, the light in the first wavelength range and light in a wavelength range other than the first wavelength range, selecting the light in a wavelength range other than the first wavelength range as light for imaging, and emitting the light toward the imaging step, a defective portion candidate detection step of detecting candidates for the defective portion using the captured image obtained in the imaging step, and a defective portion specifying step of specifying a portion to be detected as the defective portion from the candidates for the defective portion, and in which, in the defective portion specifying step, in a case where the optical wavelength conversion sheet is irradiated from a back surface side with illumination light including the light in the first wavelength range and observed from a front surface side, a portion to be different in luminance from surrounding portions, which is determined by visual observation, is specified as the defective portion.

In the defective portion specifying step, it is preferable that the defective portion is specified by assuming a portion with a brightness of 135% or more relative to a brightness of the surrounding portions as the portion to be different in luminance from surrounding portions, which is determined by visual observation.

Furthermore, the optical wavelength conversion sheet according to an aspect of the present invention is manufactured by the manufacturing method for an optical wavelength conversion sheet described above.

In addition, the optical wavelength conversion sheet according to an aspect of the present invention includes an optical wavelength conversion layer that contains an optical wavelength converter which emits, by receiving light in a first wavelength range, light in a second wavelength range having a peak wavelength different from a peak wavelength of the light in the first wavelength range, in which, in a case of being irradiated from a back surface side with illumination light including the light in the first wavelength range and observed from a front surface side, a portion with a brightness of less than 135% relative to a brightness of surrounding portions is regarded as a normal portion, a portion with a brightness of 135% or more relative to the brightness of the surrounding portions is regarded as a defective portion, and the optical wavelength conversion sheet is composed of only the normal portion, by removing the defective portion from a portion to be used as a product.

Furthermore, the optical wavelength conversion sheet according to an aspect of the present invention includes an optical wavelength conversion layer that contains an optical wavelength converter which emits, by receiving light in a first wavelength range, light in a second wavelength range having a peak wavelength different from a peak wavelength of the light in the first wavelength range, in which, in a case of being irradiated from a back surface side with illumination light including the light in the first wavelength range and observed from a front surface side, a portion with a size of less than 400 μm, where luminance differs from surrounding portions, is regarded as a normal portion, a portion with a size of 400 μm or more, where luminance differs from the surrounding portions, is regarded as a defective portion, and the optical wavelength conversion sheet is composed of only the normal portion, by removing the defective portion from a portion to be used as a product.

In addition, the optical wavelength conversion sheet according to an aspect of the present invention includes an optical wavelength conversion layer that contains an optical wavelength converter which emits, by receiving light in a first wavelength range, light in a second wavelength range having a peak wavelength different from a peak wavelength of the light in the first wavelength range, in which, in a case of being irradiated from a back surface side with illumination light including the light in the first wavelength range and observed from a front surface side, a portion with a brightness of less than 135% relative to a brightness of surrounding portions and with a size of less than 400 μm is regarded as a normal portion, a portion with a brightness of 135% or more relative to the brightness of the surrounding portions and with a size of 400 μm or more is regarded as a defective portion, and the optical wavelength conversion sheet is composed of only the normal portion, by removing the defective portion from a portion to be used as a product.

It is preferable that a support layer is provided on a back surface side of the optical wavelength conversion layer.

It is preferable that a plurality of storage chambers are formed in the optical wavelength conversion layer by partitioning the optical wavelength conversion layer with a partition wall perpendicular to a layer surface.

In addition, the backlight device of a liquid crystal panel according to an aspect of the present invention includes the above-described optical wavelength conversion sheet.

Furthermore, the liquid crystal panel according to an aspect of the present invention includes the above-described optical wavelength conversion sheet.

In addition, the liquid crystal display device according to an aspect of the present invention includes the above-described optical wavelength conversion sheet according to any one of claims, a liquid crystal panel, and a backlight device.

According to the present invention, it is possible to improve inspection accuracy of an optical wavelength conversion sheet without taking time and effort.

BRIEF DESCRIPTION OF THE DRAWINGS

FIG. 13 is an explanatory diagram showing a verification result of an inspection device.

FIG. 15 is an explanatory diagram showing an analysis result of the captured image.

DESCRIPTION OF THE PREFERRED EMBODIMENTS

First Embodiment

Figure 1:
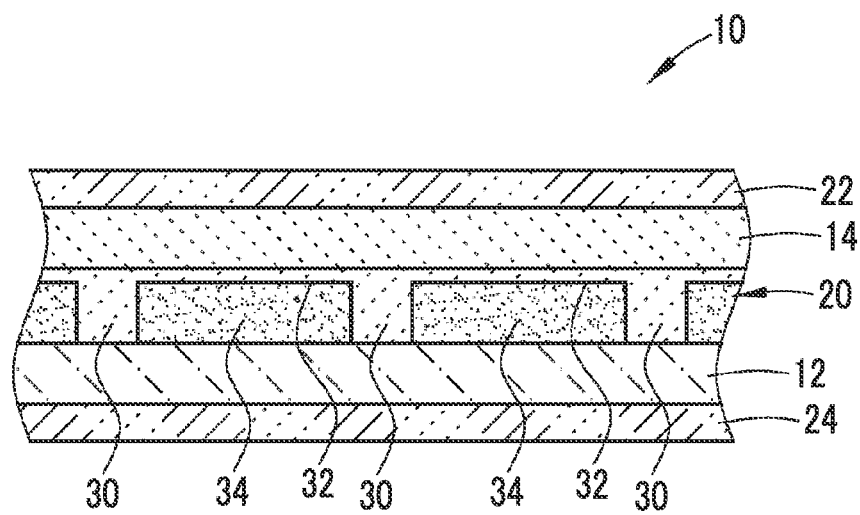
FIG. 1 is a cross-sectional view of an optical wavelength conversion sheet.

FIG. 1 shows an optical wavelength conversion sheet 10 according to the embodiment of the present invention. The optical wavelength conversion sheet 10 is manufactured by a manufacturing equipment 50 (a manufacturing device for an optical wavelength conversion sheet) (see FIG. 3) described later, and is used, for example, in a backlight unit of a liquid crystal display device.

In the optical wavelength conversion sheet 10, a quantum dot layer 20 (optical wavelength conversion layer) is formed between a support layer 12 and an optical layer 14. A front surface (upper surface) of the optical wavelength conversion sheet 10 is covered with a laminated film 22 (front surface side protective film), and a back surface (lower surface) of the optical wavelength conversion sheet 10 is covered with a laminated film 24 (back surface side protective film). The laminated films 22 and 24 are formed of a transparent material. The laminated films 22 and 24 are provided to protect the optical wavelength conversion sheet 10 until the optical wavelength conversion sheet 10 is used, such as mounting the optical wavelength conversion sheet 10 on the backlight unit of a liquid crystal display device, and are peeled off from the optical wavelength conversion sheet 10 in a case of using the optical wavelength conversion sheet 10.

In a case where the optical wavelength conversion sheet 10 is used in a backlight unit of a liquid crystal display device, a backlight which emits light having a peak wavelength in a wavelength range of 400 nm or more and less than 500 nm (first wavelength range) (hereinafter, blue light) is disposed on a back surface side (lower surface side) of the support layer 12, a liquid crystal panel filled with a liquid crystal is disposed on a front surface side (upper surface side) of the optical layer 14.

In the present embodiment, as the support layer 12, a sheet-like member having a thickness of approximately 60 μm, which has a function of reflecting light having a wavelength of 500 nm to 800 nm, is used. In addition, in the present embodiment, as the optical layer 14, a sheet-like member having a thickness of approximately 150 μm, in which a prism is formed on the front surface side and which has a function of diffusing light, is used. The support layer 12 is not limited to the present embodiment as long as it has at least a function of transmitting light (in the present embodiment, the blue light) from the backlight of a liquid crystal display device. In addition, it is sufficient that the optical layer 14 has a function of transmitting at least visible light (white light including the blue light and red light and green light described later). Furthermore, thicknesses of the support layer 12, the optical layer 14, and the quantum dot layer 20 described later can be freely set without being limited to the present embodiment.

Figure 2:
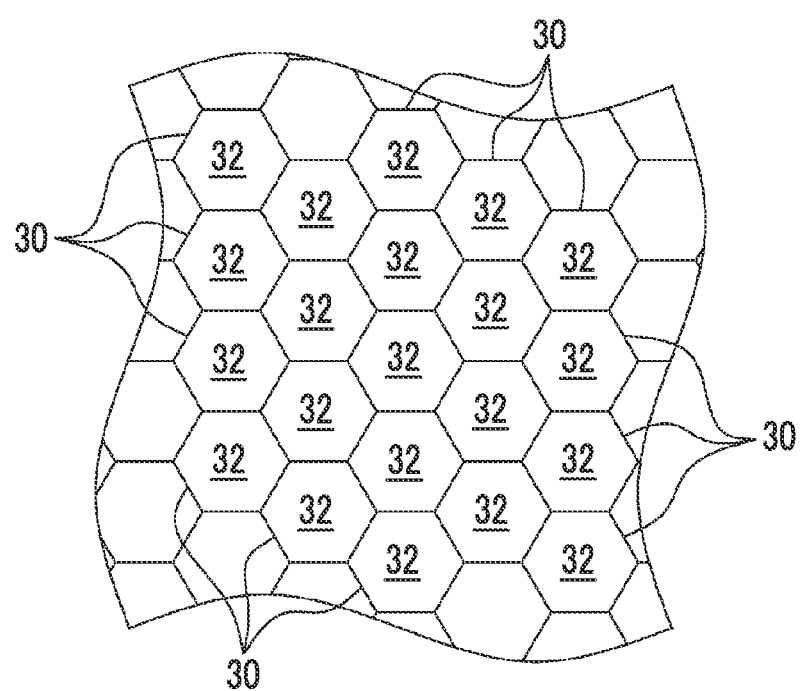
FIG. 2 is an explanatory diagram showing a configuration of a partition wall.

The quantum dot layer 20 has a thickness of approximately 30 μm. The quantum dot layer 20 is partitioned by a partition wall 30 perpendicular to a layer surface to form a plurality of storage chambers 32, and these storage chambers 32 are arranged vertically and horizontally along the layer surface (parallel to the layer surface). In the present embodiment, a honeycomb structure is formed by the partition wall 30. That is, as shown in FIG. 2, in a case where the quantum dot layer 20 is observed from a direction perpendicular to the layer surface, the quantum dot layer 20 has a structure in which a plurality of regular hexagonal storage chambers 32 formed by being partitioned by a partition wall 30 are arranged without gaps along the layer surface.

Returning to FIG. 1, each storage chamber 32 is encapsulated with a light emitter 34 (wavelength converter) including quantum dots (wavelength converters). As the quantum dot, in the present embodiment, two types of a quantum dot which emits, by receiving the blue light, light having a peak wavelength in a wavelength range of 600 nm or more and 680 nm or less (second wavelength range) (hereinafter, red light) and a quantum dot which emits, by receiving the blue light, light having a peak wavelength in a wavelength range of 500 nm or more and less than 600 nm (second wavelength range) (hereinafter, green light) are used. That is, the light emitter 34 includes two types of quantum dots. Accordingly, in a case where the optical wavelength conversion sheet 10 (quantum dot layer 20) is illuminated with the blue light, white light which includes the blue light used for the illumination and the red light and green light emitted from the two types of quantum dots received the illumination light (blue light) is obtained.

In the present embodiment, an example has been described in which the light in the first wavelength range is the blue light and the light in the second wavelength range is the red light and green light. However, the present invention is not limited thereto, and for example, the light in the first wavelength range may be red light and the light in the second wavelength range is blue light and green light. Needless to say, the light in the first wavelength range may be green light and the light in the second wavelength range may be red light and blue light. However, a difference between a peak of the light in the first wavelength range and a peak of the light in the second wavelength range is preferably in a range of 10 nm to 400 nm, and more preferably in a range of 100 to 400 nm.

The optical wavelength conversion sheet 10 having the above-described configuration is manufactured through inspection by an inspection device 70 (see FIGS. 3 and 4) described later, whereby the number of defective portions per 1 $m^2$ is 1 or less. In a case where the optical wavelength conversion sheet 10 is illuminated from the back surface side and imaged from the front surface side, the defective portion is a portion where a brightness of the imaged image differs from a brightness of surrounding portions by 7% or more, and a size is 100 μm or more.

Figure 3:
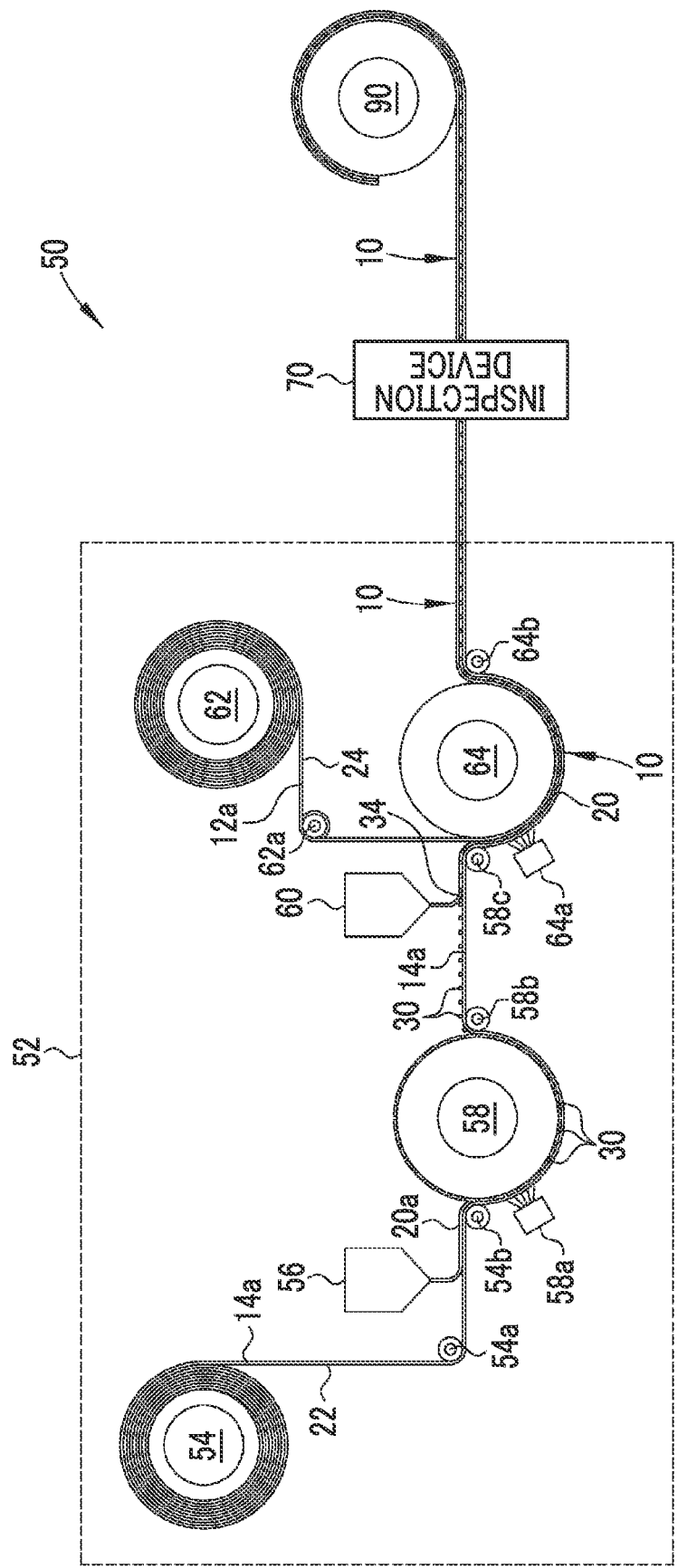
FIG. 3 is an explanatory diagram of a manufacturing equipment for the optical wavelength conversion sheet.

FIG. 3 shows a manufacturing equipment 50 (manufacturing device of the optical wavelength conversion sheet) for manufacturing the above-described optical wavelength conversion sheet 10. The manufacturing equipment 50 includes a forming device 52 (forming step) for forming the quantum dot layer 20, and an inspection device 70 (inspection step) for inspecting the optical wavelength conversion sheet 10 on which the quantum dot layer 20 is formed.

The forming device 52 includes a first feed roller 54, a first casting die 56, a shape-imparting roller 58, a second casting die 60, a second feed roller 62, and a layering roller 64. An optical sheet 14a constituting the optical layer 14 is wound around the first feed roller 54, and the first feed roller 54 feeds the wound optical sheet 14a toward the shape-imparting roller 58 through transport rollers 54a and 54b. In the present embodiment, as the optical sheet 14a, the laminated film 22 attached to the front surface (surface opposite to the first casting die 56 in FIG. 3) is fed from the first feed roller 54, but the laminated film 22 may be adhered to the front surface of the optical sheet 14a downstream of the first feed roller 54.

The first casting die 56 is disposed between the transport rollers 54a and 54b, and the optical sheet 14a passes below the first casting die 56 with the back surface facing the first casting die 56. In the first casting die 56, a casting film 20a is formed by ejecting a transparent curable (in the present embodiment, ultraviolet curable) resin onto the back surface of the optical sheet 14a from an outlet elongated in a width direction of the optical sheet 14a.

A groove for forming the partition wall 30 is formed on a peripheral surface of the shape-imparting roller 58. In the optical sheet 14a on which the casting film 20a is formed, the casting film 20a is pressed against the shape-imparting roller 58 and is deformed into the shape of the partition wall 30. In this state, the casting film 20a is cured by being irradiated with ultraviolet rays from an ultraviolet light source 58*a*. As a result, the partition wall 30 is formed. The optical sheet 14*a* on which the partition wall 30 is formed is transported toward the layering roller 64 through transport rollers 58*b* and 58*c*.

The second casting die 60 is disposed between the transport rollers 58*b* and 58*c*, and the optical sheet 14*a* passes below the second casting die 60 with the back surface on which the partition wall 30 is formed facing the second casting die 60. The second casting die 60 ejects the light emitter 34 from an outlet elongated in a width direction of the optical sheet 14*a*. Accordingly, a space between the partition walls 30 (that is, the storage chamber 32) is filled with the light emitter 34. In the present embodiment, a curable (in the present embodiment, ultraviolet curable) composition in which the two types of quantum dots described above are mixed and blended is used as the light emitter 34.

The second feed roller 62 is provided on the back surface side of the optical sheet 14*a*. A support sheet 12*a* constituting the support layer 12 is wound around the second feed roller 62, and the second feed roller 62 feeds the wound support sheet 12*a* toward the layering roller 64 through a transport roller 62*a*. In the present embodiment, as the support sheet 12*a*, the laminated film 24 attached to the back surface (surface opposite to the optical sheet 14*a*) is fed from the second feed roller 62, but the laminated film 24 may be adhered to the back surface of the support sheet 12*a* downstream of the second feed roller 62.

The support sheet 12*a*, which is fed from the second feed roller 62, is disposed on the back surface (surface on which the partition wall 30 is formed) of the optical sheet 14*a* on the downstream side of the second casting die 60, and is pressed against the layering roller 64 together with the optical sheet 14*a*. In this state, the support sheet 12*a* and the optical sheet 14*a* are adhered to each other by being irradiated with ultraviolet rays from an ultraviolet light source 64*a*. As a result, the quantum dot layer 20 (optical wavelength conversion sheet 10) is formed. The optical wavelength conversion sheet 10 on which the quantum dot layer 20 is formed is transported to the inspection device 70 (inspection device for an optical wavelength conversion sheet) through a transport roller 64*b*.

Figure 4:
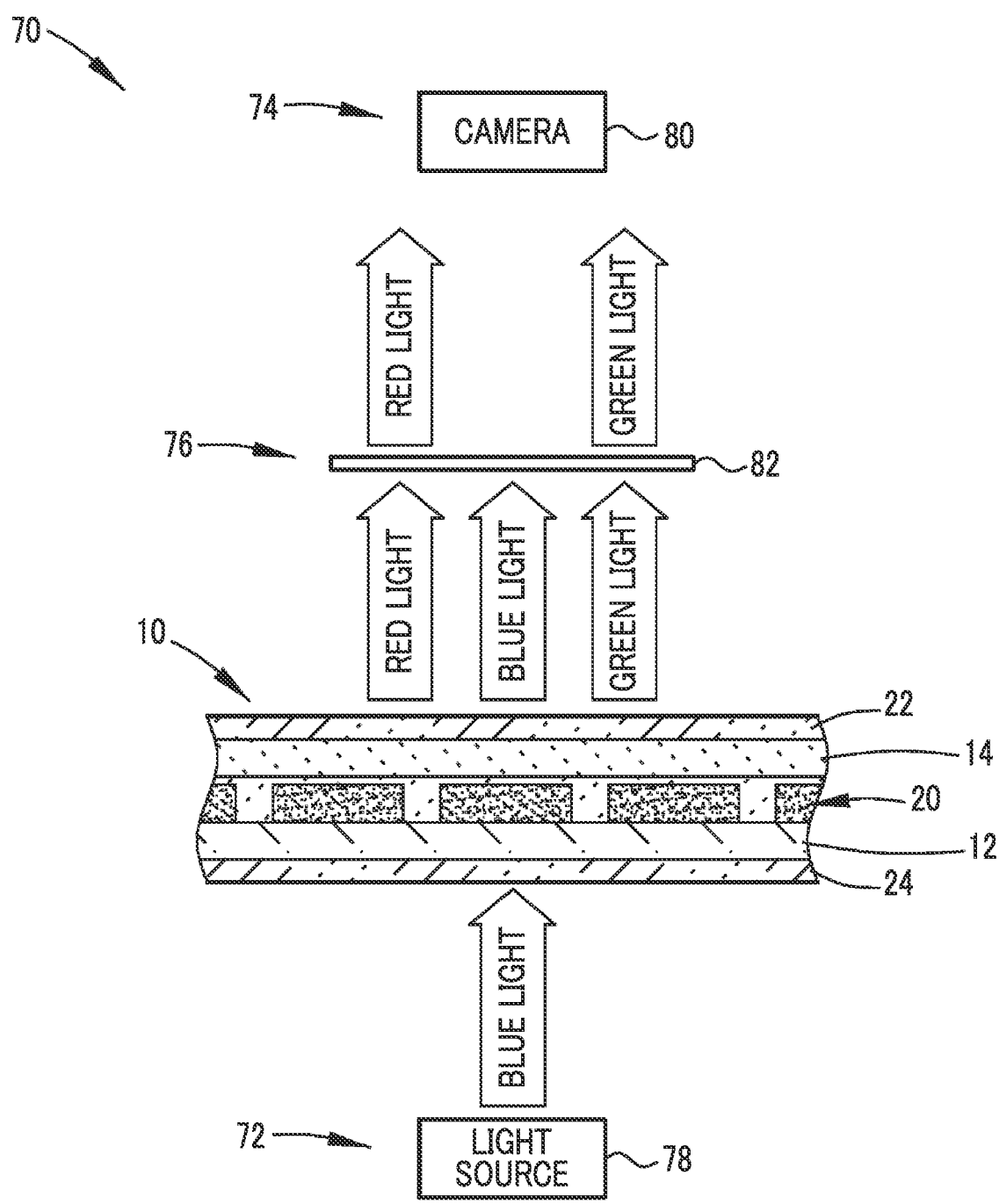
FIG. 4 is an explanatory diagram of an inspection device (primary inspection device).

As shown in FIG. 4, the inspection device 70 includes an irradiation mechanism 72 (irradiating step), an imaging mechanism 74 (imaging step), and an imaging wavelength selection mechanism 76 (imaging wavelength selection step), and is used for inspection (detection) of a defective portion described later.

The irradiation mechanism 72 includes a light source 78 which emits blue light similar to the backlight of a liquid crystal display device. A light source 78 is disposed on the back surface side (lower side of FIG. 4) of the optical wavelength conversion sheet 10 and emits illumination light (blue light) toward the back surface of the optical wavelength conversion sheet 10, and in the present embodiment, the back surface of the optical wavelength conversion sheet 10 is vertically irradiated with the illumination light.

The imaging mechanism 74 includes a camera 80. The camera 80 is disposed on the front surface side (upper side in FIG. 4) of the optical wavelength conversion sheet 10 in a state where an imaging optical axis is aligned with an illumination optical axis from the light source 78, and images the optical wavelength conversion sheet 10. As described above, in the present embodiment, since the illumination light is vertically emitted toward the optical wavelength conversion sheet 10, the camera 80 images the optical wavelength conversion sheet 10 from the vertical direction.

The imaging wavelength selection mechanism 76 has a function of separating, in the optical wavelength conversion sheet 10 and the imaging mechanism 74, light from the optical wavelength conversion sheet 10 into the light in the first wavelength range and light in a wavelength range other than the first wavelength range, and selecting the light in a wavelength range other than the first wavelength range as light for imaging and emitting the light toward the imaging mechanism 74. In the present embodiment, the function is realized by a filter 82. Specifically, the imaging wavelength selection mechanism 76 includes the filter 82 between the optical wavelength conversion sheet 10 and the imaging mechanism 74 (camera 80). The filter 82 has a function of cutting the light in the first wavelength range and transmitting the light in a wavelength range other than the first wavelength range (that is, in the present embodiment, a function that cuts the blue light in a wavelength range of 400 nm or more and less than 500 nm and transmits the red light and green light which are light in other wavelength ranges). Accordingly, the camera 80 images an image from which only the blue light is removed, that is, an image formed from the red light and the green light. In addition to the method of using the filter 82 as described above, the imaging wavelength selection mechanism 76 can select the wavelength to be imaged using various well-known methods such as a method of using a plurality of wavelength-selectable light-receiving elements as a detection unit of the camera 80 and a method of separating wavelengths using a spectroscope.

Figure 5:
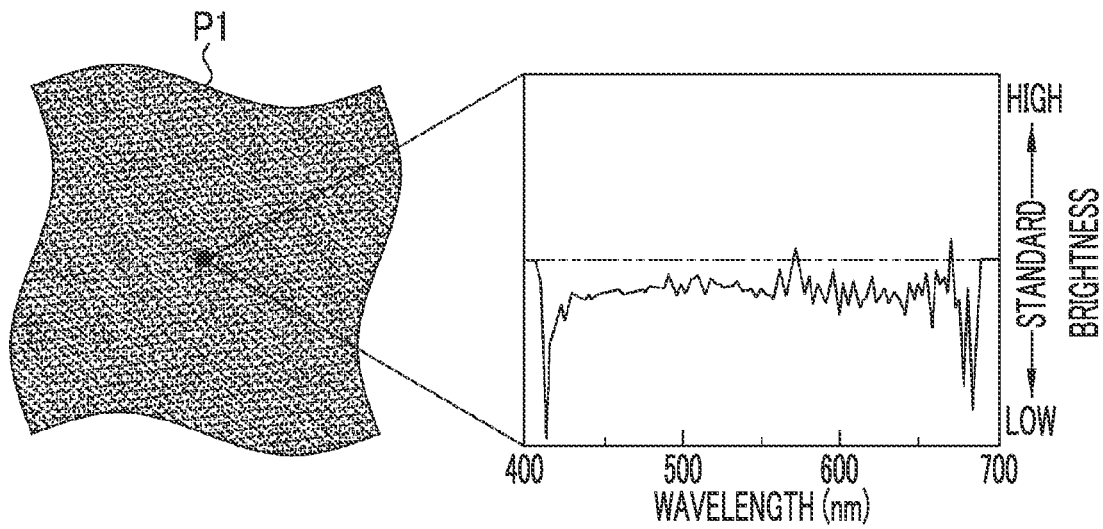
FIG. 5 is an explanatory diagram of a captured image and a spectrum.

As shown in FIG. 5, in a case where a foreign matter is mixed in the optical wavelength conversion sheet 10, in a captured image P1 imaged by the camera 80, a foreign matter portion is to be darker (less bright) than surrounding portions without the foreign matter. It is considered that this is caused by the fact that light transmittance in all wavelength ranges of blue, red, and green is lower in the foreign matter portion than in the other portions.

Figure 6:
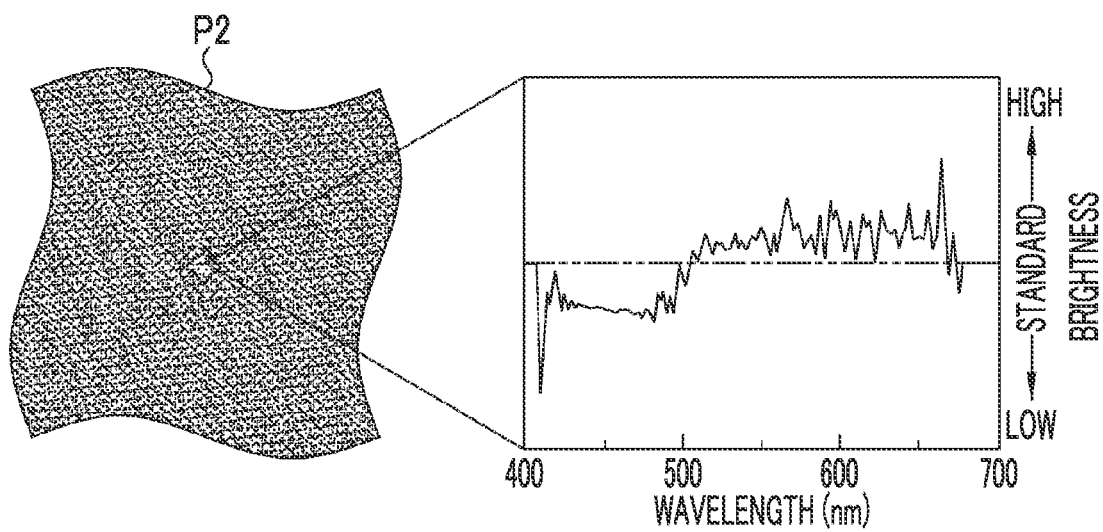
FIG. 6 is an explanatory diagram of a captured image and a spectrum.

In addition, as shown in FIG. 6, in a case where a portion having a large amount of quantum dots is present in the optical wavelength conversion sheet 10, in a captured image P2 imaged by the camera 80, a portion having a large amount of quantum dots is to be brighter (more bright) than other portions. It is considered that this is caused by the fact that, in the portion having a large amount of quantum dots, transmittance of the blue light decreases, but light amounts of the red light and green light increase. Therefore, by cutting the blue light with the imaging wavelength selection mechanism 76, an increase in light amount of the red light and green light is detected.

Figure 7:
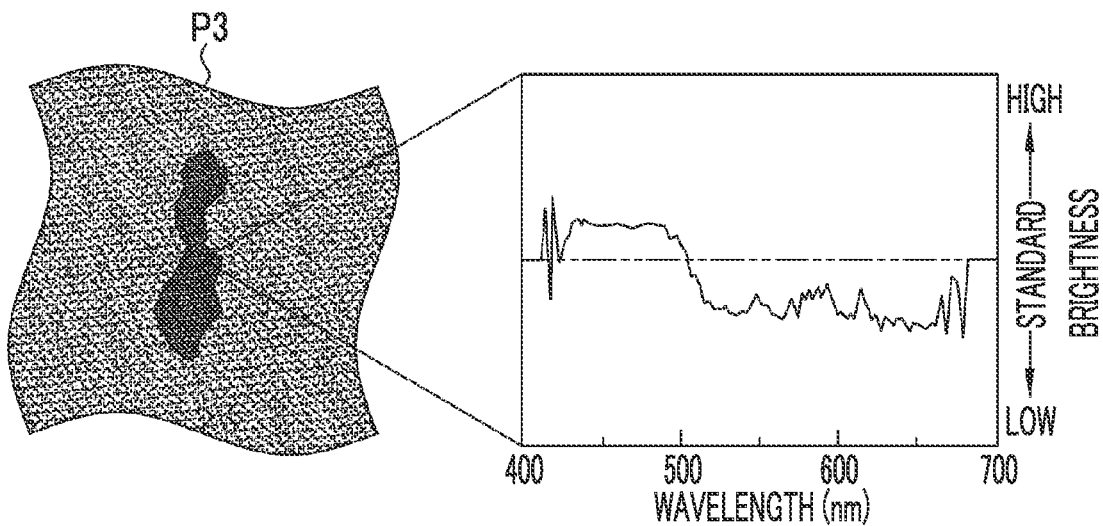
FIG. 7 is an explanatory diagram of a captured image and a spectrum.

Furthermore, as shown in FIG. 7, in a case where a portion having a small amount of quantum dots is present in the optical wavelength conversion sheet 10, in a captured image P3 imaged by the camera 80, a portion having a small amount of quantum dots is to be darker (less bright) than other portions. It is considered that this is caused by the fact that, in the portion having a small amount of quantum dots, transmittance of the blue light increases, but light amounts of the red light and green light decrease. Therefore, by cutting the blue light with the imaging wavelength selection mechanism 76, a decrease in light amount of the red light and green light is detected.

FIGS. 5, 6, and 7 show a spectral diagram of the wavelength of the defective portion. In the spectrum, as an illumination light source, blue light (in a wavelength range of 400 nm or more and less than 500 nm) is used, a wavelength cut filter is not used on the camera side, and the wavelength spectrum of the defective portion is measured with a camera having a wavelength measurement function. In a case where a normal part other than the defective portion is set as "standard" (two-dot chain line in the graph), a difference between the normal part and the defective part for each wavelength is calculated and used as the spectrum of the light amount of the defective portion. Same as the brightness and darkness of the imaging described above, the content of the defective portion can be grasped from a pattern of magnitudes of the brightness of the blue portion and the red and green portions of the spectrum in the defective portion.

In the inspection using the inspection device 70, a portion considered to have the above-described defect is detected as the defective portion based on the image imaged by the camera 80. Specifically, a portion where the brightness of the imaged image differs from the brightness of surrounding portions by 7% or more, and a size is 100 μm or more is detected as the defective portion. The defective portion may be detected visually or mechanically using a well-known image analysis device or the like. According to the inspection method of the present invention, even in a case where there is a difference in brightness between the quantum dot portion and the partition wall portion, the defective portion can be reliably detected. Specifically, in the surface inspection image, in a case where a brightness of the partition wall portion is 135, a brightness of the quantum dot other than the partition wall portion is 145, and the overall average is 140, relatively stable detection can be performed in a case where the difference in brightness is approximately 10 or more.

In the present embodiment, the inspection is performed without distinguishing the brightness of the image according to the wavelength range, but the inspection may be performed by analyzing the spectrum of the captured image, and distinguishing the brightness of the image according to the wavelength range, such that the light amount of red light is large and the light amount of green light is small. In this case, it is possible to detect that the amount of the quantum dots emitting the red light (or the green light) is large (or small).

As described above, in the inspection device 70, the defective portion can be detected by one inspection (imaging) without performing the inspection (imaging) for each type of the quantum dot, whereby the inspection is easy.

Furthermore, in the inspection device 70, by cutting the light in the first wavelength range (blue light) with the filter 82, it is possible to perform a highly accurate inspection that eliminates the influence of defects (noise) which do not pose a problem in a case of mounting the optical wavelength conversion sheet 10 on the liquid crystal display device.

That is, since, unlike the red light and green light, the blue light directed toward the camera 80 also passes through layers on the back surface side (lower layer side) of the quantum dot layer 20, for example, the blue light is affected by the influence of defects (noise) which do not pose a problem in a case of mounting the optical wavelength conversion sheet 10 on the liquid crystal display device, such as scratches on the laminated film 24. In addition, fine bubbles generated between the quantum dot layer 20 and the layers of each layer do not pose a problem in a case of mounting the optical wavelength conversion sheet 10 on the liquid crystal display device, but the blue light is also affected by such defects (noise). In the inspection device 70, by cutting such blue light, it is possible to eliminate the influence of noise and perform an inspection with high accuracy.

Returning to FIG. 3, in a case where the defective portion is not detected as a result of the inspection using the inspection device 70, the inspected optical wavelength conversion sheet 10 is wound around a winding roller 90 as a product. On the other hand, in a case where the defective portion is detected, the defective portion is excluded, and then the optical wavelength conversion sheet 10 is wound around the winding roller 90. The defective portion is excluded, for example, by cutting off the optical wavelength conversion sheet 10 having a constant length including the defective portion. In this case, the number of defective portions per 1 m$^2$ of the optical wavelength conversion sheet 10 as a product is set to 1 or less.

Second Embodiment

Figure 8:
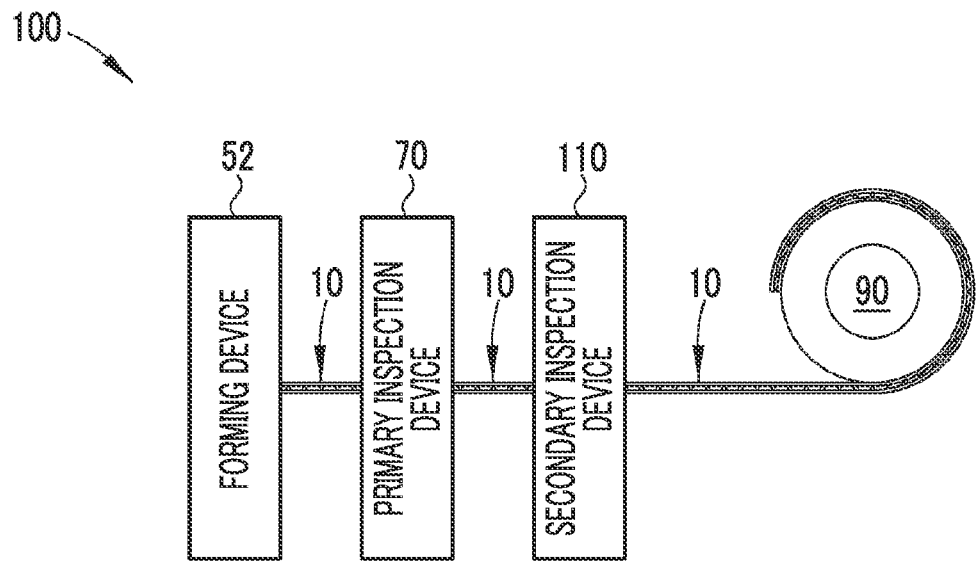
FIG. 8 is an explanatory diagram of a manufacturing equipment for the optical wavelength conversion sheet.

As shown in FIG. 8, a manufacturing equipment 100 (manufacturing device for an optical wavelength conversion sheet) according to a second embodiment includes an inspection device 110 (secondary inspection device, secondary inspection step), in addition to the forming device 52 (forming step), the inspection device 70 (primary inspection device, primary inspection step), and the winding roller 90 described above. Note that in the description made with reference to FIG. 8 and subsequent drawings, the same members as those in the above-described embodiment are given the same reference numerals, and the description thereof will be omitted. In addition, in the following description, the inspection device 70 will be referred to as a primary inspection device 70 and the inspection device 110 will be referred to as a secondary inspection device 110.

Figure 9:
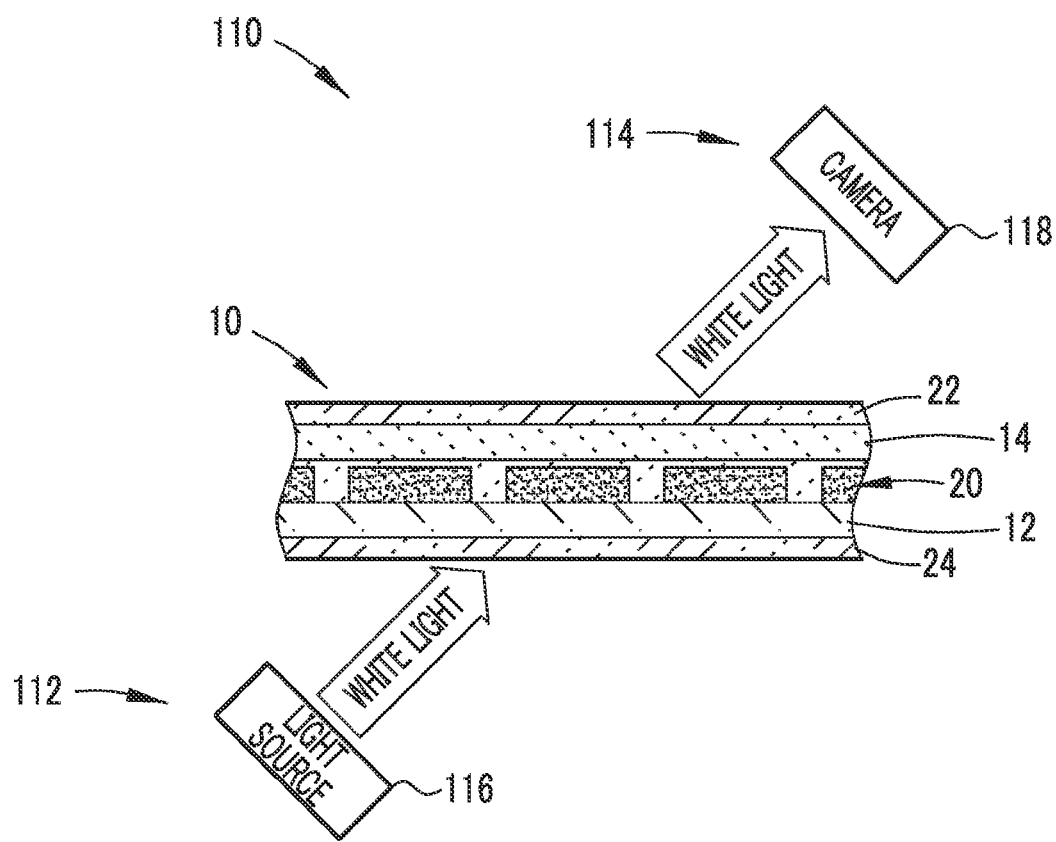
FIG. 9 is an explanatory diagram of a secondary inspection device.

As shown in FIG. 9, the secondary inspection device 110 includes a secondary irradiation mechanism 112 (secondary irradiating step) and a secondary imaging mechanism 114 (secondary imaging step). The secondary irradiation mechanism 112 includes a light source 116 which emits white light including blue light, red light, and green light. The light source 116 is disposed on the back surface side of the optical wavelength conversion sheet 10 and emits illumination light (white light) toward the back surface of the optical wavelength conversion sheet 10, and in the present embodiment, the back surface of the optical wavelength conversion sheet 10 is irradiated with the illumination light at an angle of 45° from the vertical direction.

The secondary imaging mechanism 114 includes a camera 118. The camera 118 is disposed on the front surface side of the optical wavelength conversion sheet 10 in a state where an imaging optical axis is aligned with an illumination optical axis from the light source 116, and images the optical wavelength conversion sheet 10. As described above, in the present embodiment, since the illumination light is emitted toward the optical wavelength conversion sheet 10 at an angle of 45° from the vertical direction, the camera 118 images the optical wavelength conversion sheet 10 from a direction tilted 45° from the vertical direction. Same as the above-described inspection device 70 (see FIG. 4), the illumination light may be vertically emitted toward the optical wavelength conversion sheet 10, and the camera 118 images the optical wavelength conversion sheet 10 from the vertical direction.

Figure 10:
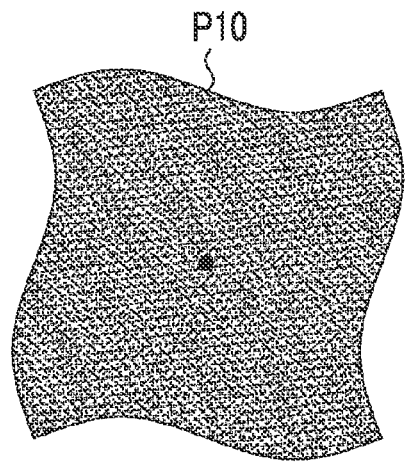
FIG. 10 is an explanatory diagram of a captured image.

As shown in FIG. 10, in a case where a foreign matter is mixed in the optical wavelength conversion sheet 10, in a captured image P10 (secondary captured image) imaged by the camera 118, same as the captured image P1 (primary captured image) imaged by the camera 80 described above (see FIG. 5), a foreign matter portion is to be darker (less bright) than other portions. It is considered that this is caused by the fact that light transmittance is lower in the foreign matter portion than in the other portions.

Figure 11:
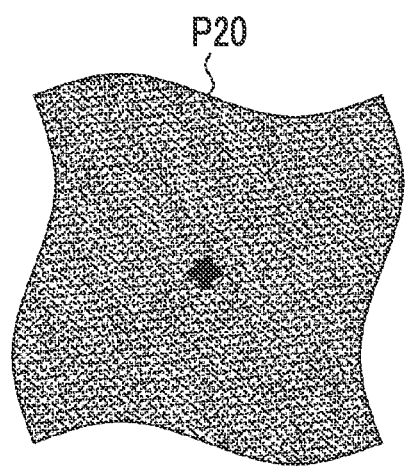
FIG. 11 is an explanatory diagram of a captured image.

On the other hand, as shown in FIG. 11, in a case where a portion having a large amount of quantum dots is present in the optical wavelength conversion sheet 10, in a captured image P20 (secondary captured image) imaged by the camera 118, contrary to the captured image P2 (primary captured image) imaged by the camera 80 described above (see FIG. 6), a portion having a large amount of quantum dots is to be darker (less bright) than other portions. It is considered that this is caused by the fact that, in the portion having a large amount of quantum dots, even in a case where transmittance of the blue light decreases and light amounts of the red light and green light increase, it is not possible to compensate for the decrease in blue light, and the total light amount (the sum of the blue light, the red light, and the green light) decreases.

Figure 12:
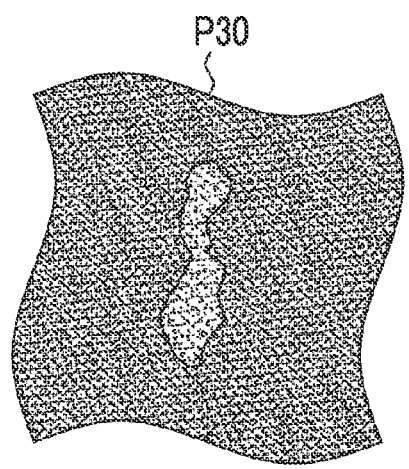
FIG. 12 is an explanatory diagram of a captured image.

In addition, as shown in FIG. 12, in a case where a portion having a small amount of quantum dots is present in the optical wavelength conversion sheet 10, in a captured image P30 (secondary captured image) imaged by the camera 118, contrary to the captured image P3(primary captured image) imaged by the camera 80 described above (see FIG. 7), a portion having a small amount of quantum dots is to be brighter (more bright) than other portions. It is considered that this is caused by the fact that, in the portion having a small amount of quantum dots, although the red light and green light are generated less by the quantum dots, transmittance of the illumination light as white light is improved, resulting in an increase in light amount.

The secondary inspection device 110 is different from the primary inspection device 70 in that the illumination light is white light and that the filter 82 (see FIG. 4) cutting the light in the first wavelength range (blue light) is not provided. Therefore, in a case where there is a defective portion such as a scratch or foreign matter on the back surface side of the quantum dot layer 20, such as the laminated film 24, in the captured image (secondary captured image) imaged by the camera 118, the defective portion is to be darker (less bright). On the other hand, in a case where fine bubbles are generated between the quantum dot layer 20 and the layers of each layer, in the captured image (secondary captured image) imaged by the camera 118, the defective portion is to be brighter (more bright).

As described above, the secondary captured image has an aspect different from that of the primary captured image, and comparing the two, since the primary captured image is inspected using the same illumination light as in the mounting aspect, the defective portion and the like are reproduced in the same manner as in the mounting aspect. On the other hand, in the secondary captured image, the reproduction aspect of the defective portion and the like may be different from the mounting aspect. Therefore, in a case where either one is used for the inspection, it is preferable to use the primary captured image.

On the other hand, as described above, in the present embodiment that both the primary captured image and the secondary captured image, in which the aspect of the image is different depending on the type of the defect, can be obtained, by comparing the two (by providing a comparison step, a comparison device), the type of defect can be specified. Specifically, for example, in the primary captured image, it is difficult to determine, regarding the defective portion which is reproduced dark (with low brightness), whether the defect is due to the inclusion of foreign matter or the defect has a small amount of quantum dots only with the primary captured image. On the other hand, in the secondary captured image, the case of including the foreign matter is reproduced dark (with low brightness) and the case of having a small amount of quantum dots is reproduced bright (with high brightness). Therefore, by comparing the primary captured image and the secondary captured image, it is possible to specify which defect the defect is. The comparison between the primary captured image and the secondary captured image may be performed visually or mechanically using a well-known image analysis device or the like.

In the present embodiment, an example has been described in which separate light sources and cameras are used for the primary inspection device and the secondary inspection device, but a common light source and camera may be used for the primary inspection device and the secondary inspection device. In this case, it is sufficient that a light source capable of selectively emitting blue light and white light is used, the primary captured image is obtained by imaging an image while radiating blue light and inserting the filter 82 into the imaging optical axis, and the secondary captured image is obtained by imaging an image while radiating white light in a state in which the filter 82 is retracted from the imaging optical axis.

[Verification Result]

Hereinafter, with reference to FIG. 13, various aspects of the optical wavelength conversion sheet having different layer configurations will be inspected by the primary inspection device 70 and the secondary inspection device 110, and verification results of the inspection by each inspection device will be described.

As shown in FIG. 13, in the verification, as the optical wavelength conversion sheet, an optical wavelength conversion sheet having a two-layer structure consisting of the optical layer 14 and the quantum dot layer 20, an optical wavelength conversion sheet having a three-layer structure including the support layer 12 in addition to the two layers, an optical wavelength conversion sheet having a four-layer structure including the laminated film 24 on the back surface side in addition to the three layers, and an optical wavelength conversion sheet having a five-layer structure including the laminated film 22 on the front surface side in addition to the four layers are used.

Each of these four types optical wavelength conversion sheets 10 is inspected by the primary inspection device 70 and the secondary inspection device 110, and evaluated for three items of detectability, brightness and darkness of defects, and noise. In the evaluation of detectability, a case where it is possible to specify and detect defects which cause problems in a case of being mounted on a backlight unit of a liquid crystal display device (hereinafter, actual defects) is evaluated as "A", a case where the actual defects can be detected is evaluated as "B", and a case where the actual defects cannot be detected is evaluated as "C".

In addition, in the evaluation of brightness and darkness of defects, a case where the brightness and darkness of defects are reproduced in the same manner in a case of being mounted on a backlight unit of a liquid crystal display device is evaluated as "A", a case where the brightness and darkness of defects are reproduced in a different manner in a case of being mounted on a backlight unit of a liquid crystal display device is evaluated as "B", and a case where the brightness and darkness of defects cannot be detected is evaluated as "C".

Furthermore, in the evaluation of noise, a case where there is almost no detection of noise and the actual defects can be specified is evaluated as "A", a case where there are few detections of noise and the actual defects can be specified by making certain distinctions such as shape and/or size is evaluated as "B", a case where there is detection of noise and it is difficult to specify the actual defects by a mechanical detection method but the actual defects can be specified by a visual detection method is evaluated as "C", and a case where there are many detections of noise and the actual defects cannot be specified is evaluated as "D".

The verification result is as shown in FIG. 13. As shown in FIG. 13, comparing the primary inspection device 70 and the secondary inspection device 110, the primary inspection device 70 has higher evaluations than the secondary inspection device 110, and it is confirmed that highly accurate inspection can be performed.

OTHER EMBODIMENTS

In the manufacturing equipment 50 (manufacturing device for an optical wavelength conversion sheet) according to the above-described embodiment (see FIG. 3), a removing device (removal step) for removing the defective portion detected by the inspection device 70 (inspection step) (see FIG. 4) may be provided. Similarly, in the manufacturing equipment 100 (see FIG. 8), a removing device (removal step) for removing the defective portion detected by the inspection devices 70 and 110 (see FIG. 9) may be provided.

In addition, in the above-described embodiments, an example of detecting, as the defective portion, the portion where the brightness of the captured image differs from the brightness of the surrounding portions by 7% or more has been described, but in addition to this condition, a portion having a size in a range of 100 µm or more and 5000 µm or less may be detected as the defective portion. Here, the size of the portion having a brightness different from that of the surrounding portions is a value of square root of an area of the defective portion.

[Detection of Defective Portion by Image Analysis]

In addition, in a case where the defective portion is detected mechanically using an image analysis device or the like, that is, in a case of detecting the defective portion by analyzing the captured image imaged by the camera 80 or the camera 118, in order to improve the detection accuracy, it is possible to perform image processing of the analysis target. Examples of the image processing include image corrections such as contrast, brightness, and color; image processing such as noise removal, edge enhancement, and expansion/contraction processing; and processing such as image conversion to monochrome and image feature extraction.

As an example, with regard to defects caused by large fibrous foreign matter, a defect length is long and easy to see, but a defect width is narrow and a difference in brightness is small compared to the normal display brightness. In a case where the brightness fluctuates even in a case where the brightness is normal due to the difference in the portion such as the particle dot portion and the partition wall portion, a fibrous defect is detected as it is broken, and is recognized as a small defect. In this case, by adding expansion/contraction processing to the detected image, it is possible to detect defects with a size close to the original size.

Figure 14:
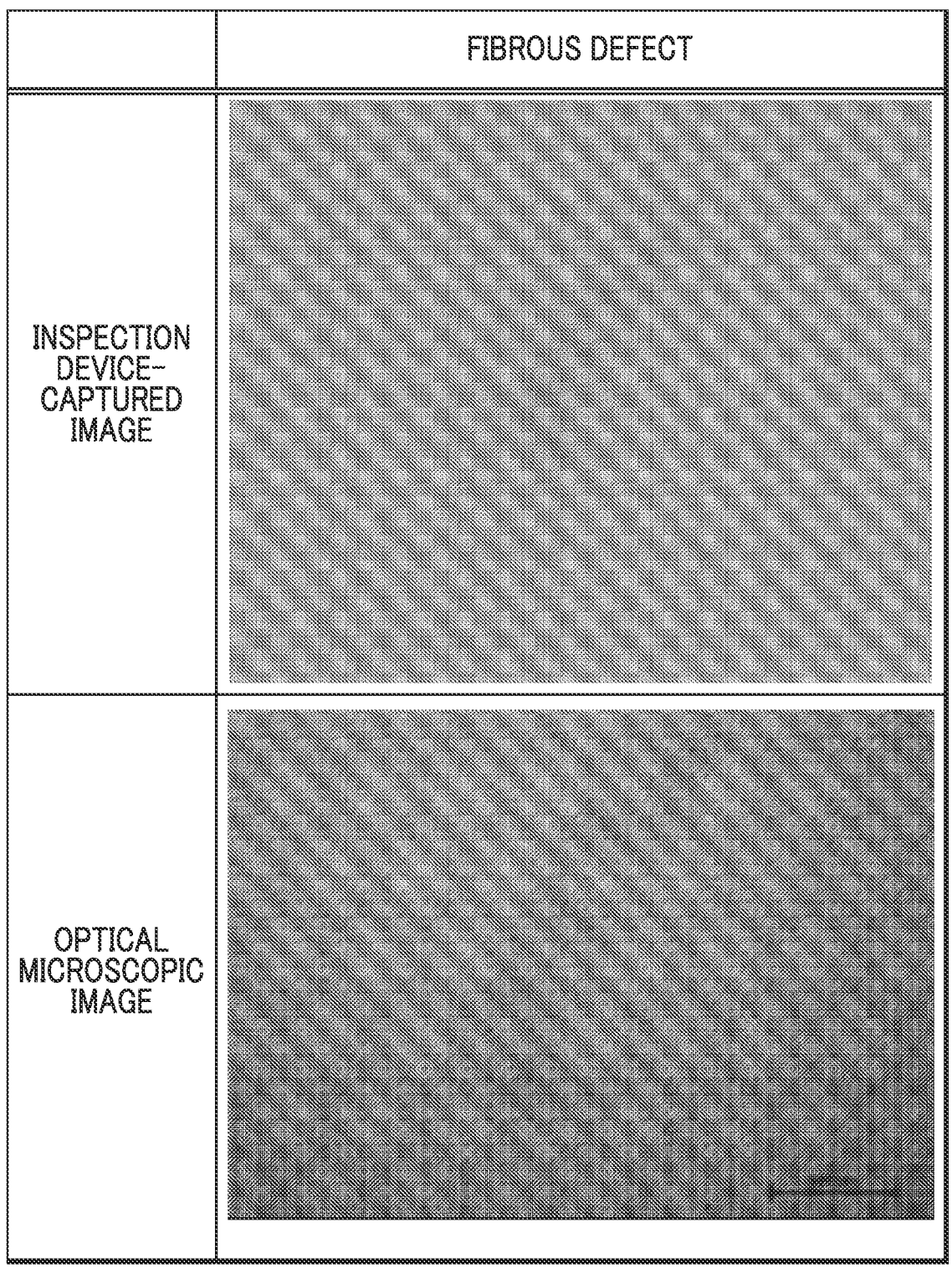
FIG. 14 is an explanatory diagram showing a captured image and an enlarged image of the captured image.

As described above, a specific example in a case where the defective portion is detected by the image analysis will be described with reference to FIGS. 14 and 15. FIG. 14 shows an optical wavelength conversion sheet in which the brightness of the central portion is different from that of the surrounding portions (in the present example, less bright) due to the above-described fibrous foreign matter, and the upper part shows a captured image of the optical wavelength conversion sheet by the inspection device and the lower part shows an image obtained by enlarging the central portion of the upper image with a microscope. In the microscopic image, it can be seen that there is a fibrous defect, but in the captured image, the difference in brightness between the surrounding particle dot portion and the partition wall portion in the fibrous defective portion appears to be small.

FIG. 15 shows analysis results of the captured image shown in FIG. 14. FIG. 15 shows three types of analysis results obtained by changing the image processing content and the threshold value with respect to the image to be analyzed, respectively, on the left side, the center, and the right side of FIG. 15.

In addition, FIG. 15 shows the upper part of the image in which a portion determined to have a brightness different from that of the surrounding portions by analysis is colored, and in the present example, the portion determined to have lower brightness than the surrounding portions is colored. The second row shows a size of the defective portion determined to have a brightness different from that of the surrounding portions, and in the present example, the number of pixels determined to have lower brightness than the surrounding portions is shown. The third row shows a threshold value for determining that the brightness is different, and in the present example, pixels below this threshold value are determined to have lower brightness than the surrounding portions. The fourth row shows the type of image processing applied to the image to be analyzed, and in the present example, the left side and the center show an example in which standard image processing (image correction, noise removal, and the like) is performed, and the right side shows an example in which expansion/contraction processing is performed in addition to the standard image processing. By applying the expansion/contraction processing of the image, the defect can be determined with a size close to the size corresponding to the actual fibrous defect.

[Tertiary Inspection]

In the above-described embodiments, the defective portion is detected by the primary inspection by the inspection device 70 or the secondary inspection by the inspection device 110, but as a result of visually observing the defective portion detected in the primary inspection or the secondary inspection, it is found that portions that do not pose any quality problems in a case of being used in products (a backlight device of a liquid crystal panel, and the like) are also included. For this reason, the defective portion detected in the primary inspection or the secondary inspection may be narrowed down by further inspection (hereinafter, tertiary inspection).

In the tertiary inspection, the defective portion detected in the primary inspection or the secondary inspection is set as candidates for the defective portion (defective portion candidate detection step), and a portion to be detected as a final defective portion is specified from such candidates (defective portion specifying step). The portion specified by the tertiary inspection is a portion among candidate for the defective portion where the brightness is determined to be different from the surrounding portions by the visual observation, and in the tertiary inspection, such a portion is specified as the final defective portion. The portion specified as the final defective portion by the inspection step including the defective portion candidate detection step and the defective portion specifying step as described above is removed in the above-described removal step to manufacture the optical wavelength conversion sheet 10. As a result, only the final defective portion visually recognizable is removed, and a sheet having a high yield in manufacturing and good quality can be obtained.

As described above, in the tertiary inspection, among candidates for the defective portion detected in the primary inspection or the secondary inspection, the portion determined by visual observation to be different in brightness from the surrounding portions is specified as the final defective portion. Therefore, the tertiary inspection can be performed by actually visually observing the candidates for the defective portion. The visual observation may be performed by directly visually observing the optical wavelength conversion sheet or by visually observing the captured image obtained by imaging the optical wavelength conversion sheet.

In addition, in the visual observation, in a case where the difference in brightness with the surrounding portions satisfies a certain "standard" and/or in a case where the defect size (size of the portion with different brightness from the surrounding portions) satisfies a certain "standard", it is found that the brightness is determined to be different from that of the surrounding portions. Therefore, in a case where the above-described "standard" is determined, it is possible to specify the final defective portion without actually performing the visual observation. That is, a portion where the difference in brightness from the surrounding portions and/or the portion where the defect size satisfies the above-described "standard" can be regarded as a portion determined to be the final defective portion by the visual observation. Accordingly, in the tertiary inspection, the captured image obtained by imaging the optical wavelength conversion sheet is analyzed, and among the candidates for the defective portion, a portion satisfying the above-described "standard" in terms of difference in brightness and/or defect size from the surrounding portions may be specified as the final defective portion.

In the present embodiment, in order to specify the final defective portion by analyzing the captured image obtained by imaging the optical wavelength conversion sheet as described above, the above-described "standard" is obtained as follows.

First, the defective portion detected in the primary inspection or the secondary inspection is visually observed for determination. The determination is performed in the same manner as in the case where the optical wavelength conversion sheet 10 is used as a product. That is, an aspect in which the optical wavelength conversion sheet 10 is used as the backlight device of a liquid crystal panel, specifically, a backlight of blue LED, an optical wavelength conversion sheet with defective portions (candidates for the defective portion) detected in the primary inspection or the secondary inspection, and DBEF (registered trademark) integrated with a prism sheet from 3M (registered trademark) as an optical diffusion sheet are arranged in this order, the optical wavelength conversion sheet 10 is illuminated with blue light from the back surface side, and the candidates for the defective portion are visually observed from the front surface side.

Figure 16:
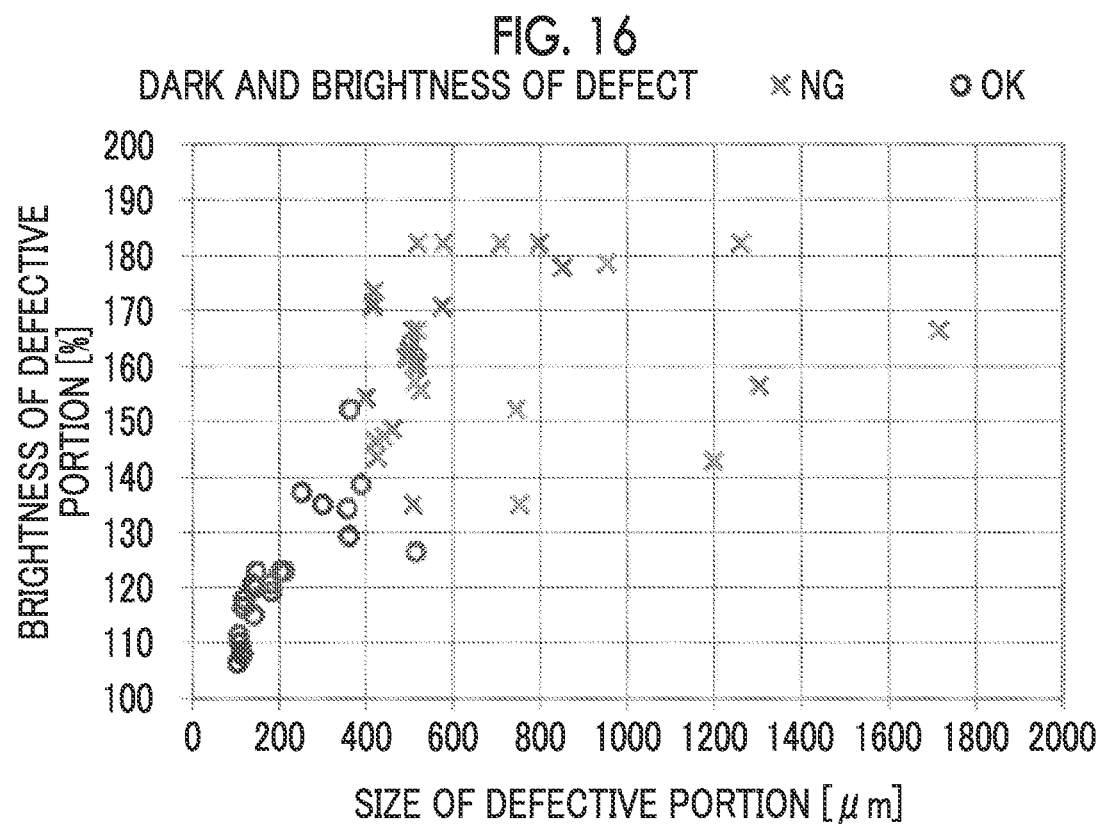
FIG. 16 is an explanatory diagram showing a result of a tertiary inspection.
Figure 17:
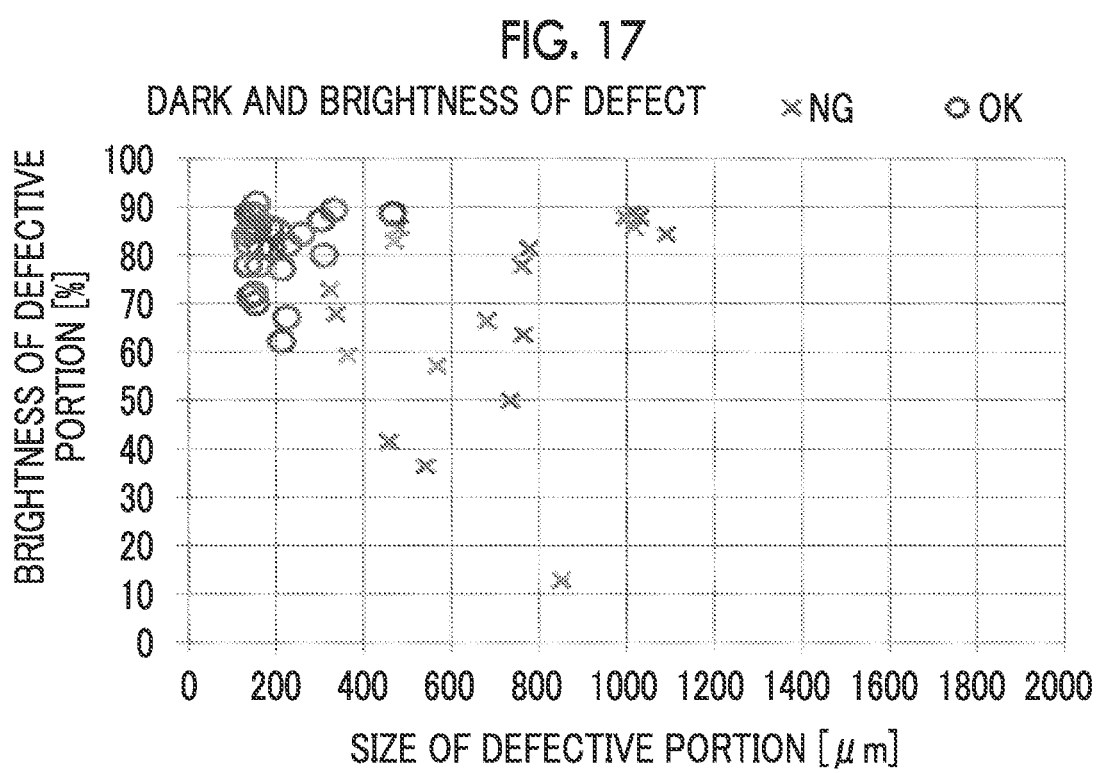
FIG. 17 is an explanatory diagram showing a result of a tertiary inspection.

A specific example in the case of performing the visual observation as described above will be described with reference to FIGS. 16 and 17. In the example of FIGS. 16 and 17, the visual observation is performed with the optical wavelength conversion sheet having a three-layer structure (see FIG. 13) in which the support layer 12 is provided in addition to the two layers consisting of the optical layer 14 and the quantum dot layer 20. In the optical wavelength conversion sheet, the thickness of the quantum dot layer is 30 µm, the thickness of the partition wall is 100 µm, and the storage chamber size of the quantum dots is 350 µm. In the inspection, the brightness of the particle dot layer is 145, the brightness of the partition wall layer is 135, and the average brightness of the observation surface is 140. The brightness shown here is a value of the gradation of each corresponding portion in a case where the image in the captured image is shown in 255 gradations of the gray scale.

In addition, the number of pixels of the defective portions (candidates for the defective portion) is detected from the image to be inspected, the area of the defective portions (candidates for the defective portion) is calculated from the number of pixels, and a value of square root of the calculated area is regarded as the size of the defective portions (candidates for the defective portion). The brightness of the defective portion is obtained as the ratio of the brightness of the defective portions (candidates for the defective portion) to the average brightness.

In FIGS. 16 and 17, in a two-dimensional region with the size of the defect on the horizontal axis and the brightness of the defect on the vertical axis, defective portions detected by the primary inspection or the secondary inspection are indexed as the candidates for the defective portion. The type of the index indicates the result of visual observation. The index "O" indicates that there is no problem in visual observation (not a defective portion) such that no difference in brightness from the surrounding portions is visually observed among the candidates for the defective portion, and the index "x" indicates that, among the candidates for the defective portion, it is determined as the final defective portion to be specified by the visual observation, such as a difference in brightness from the surrounding portions. In addition, FIG. 16 shows the result of visual observation in a case where the defective portions (candidates for the defective portion) detected in the primary inspection or the secondary inspection is detected as having a higher brightness than the surrounding portions, and FIG. 17 shows the result of visual observation in a case where the defective portions (candidates for the defective portion) detected in the primary inspection or the secondary inspection is detected as having a lower brightness than the surrounding portions.

As shown in FIG. 16, in the visual observation, among the defective portions (candidates for the defective portion) detected as having a higher brightness than the surrounding portions by the primary inspection or the secondary inspection, defective portions (candidates for the defective portion) with 135% or more of the average brightness are determined as the final defective portion. In addition, among defective portions (candidates for the defective portion) with less than 135% of the average brightness, particularly less than 130% of the average brightness, no defects to be determined as the final defective portion are detected. It is considered that this is because, in an environment with light emission, in a case where there is a defect having a higher brightness than the surrounding portions, it is difficult for the human eye to visually recognize the defect, and there is a brightness range acceptable as a product. As described above, from the example of FIG. 16, 135% of the average brightness is set as the "standard", and it is found that a portion having a brightness equal to or higher than the "standard" can be regarded as the portion to be determined as the final defective portion in the visual observation.

In addition, as shown in FIG. 16, in the visual observation, among the defective portions (candidates for the defective portion) detected as having a higher brightness than the surrounding portions by the primary inspection or the secondary inspection, defective portions (candidates for the defective portion) having a size of 400 µm or more are detected as the final defective portion. In addition, among defective portions (candidates for the defective portion) having a size of less than 400 µm, no defects to be determined as the final defective portion are detected. It is considered that this is because, in a region exceeding the storage chamber size (350 µm) of the particle dot layer, there is a region having higher brightness than the surrounding portions, and the region is easily visually recognized. As described above, from the example of FIG. 16, the size of 400 µm is set as the "standard", and it is also found that a portion having a size equal to or higher than the "standard" can be regarded as the portion to be determined as the final defective portion in the visual observation.

Furthermore, as shown in FIG. 17, in the visual observation, among the defective portions (candidates for the defective portion) detected as having a lower brightness than the surrounding portions by the primary inspection or the secondary inspection, defective portions (candidates for the defective portion) with 90% or less of the average brightness are detected as the final defective portion. It is considered that this is because a dark defective portion is relatively easy to visually recognize under alight emitting light source. As described above, from the example of FIG. 17, 90% of the average brightness is set as the "standard", and it is found that a portion having a brightness equal to or lower than the "standard" can be regarded as the portion to be determined as the final defective portion in the visual observation.

As described above, three "standards" are obtained from the examples of FIGS. 16 and 17. In the present embodiment, the tertiary inspection is performed using the "standards" calculated as described above. Specifically, the optical wavelength conversion sheet is illuminated from the back surface side under the same conditions as in the visual inspection, a captured image imaged from the front surface side is analyzed, and a portion satisfying the "standard", for example, the portion with 135% or more of the average brightness is specified as the final defective portion.

The "standard" used in the tertiary inspection is not limited thereto, and for example, the portion having a size of 400 µm or the portion with 90% or less of the average brightness may be specified as the final defective portion. Needless to say, the tertiary inspection may be performed using a "standard" other than those described above. In addition, the "standard" used in the tertiary inspection is not limited to one type, and for example, the tertiary inspection may be performed using a plurality of "standards" such that a portion with 135% or more of the average brightness and having a size of 400 µm or more is specified as the final defective portion. Further, in a case where the plurality of "standards" are used, a portion satisfying all of the plurality of "standards" may be specified as the final defective portion, or a portion satisfying one (or a plurality of) preset "standard" among the plurality of "standards" may be specified as the final defective portion.

By performing the tertiary inspection as described above, it is possible to grasp the brightness and the size of the defective portion according to the actual use state. In addition, in the primary inspection or the secondary inspection alone, even a portion having no problem in actual use is detected as the defective portion, and such a portion is excluded from the portion used as a product, resulting in a decrease in yield. However, by performing the tertiary inspection, such a problem can be prevented and the optical wavelength conversion sheet can be produced with high yield.

In addition, in the tertiary inspection, a defective portion considered to have a problem as a product, specifically, the portion with 135% or more of the average brightness, the portion having a size of 400 µm or more, and/or the portion with 90% or less of the average brightness is removed, and a high-quality optical wavelength conversion sheet can be obtained. That is, the optical wavelength conversion sheet according to the embodiment of the present invention, manufactured through the tertiary inspection, is of high quality, which does not include the above-described defective portion and is composed of only a portion (normal portion) other than the defective portion.

As described above, the high-quality optical wavelength conversion sheet according to the embodiment of the present invention is used in a backlight device of a liquid crystal panel, a liquid crystal panel, and a liquid crystal display device. The backlight device of a liquid crystal panel, the liquid crystal panel, and the liquid crystal display device are of high quality as in the optical wavelength conversion sheet according to the embodiment of the present invention.

EXPLANATION OF REFERENCES

10: optical wavelength conversion sheet
12: support layer
12a: support sheet
14: optical layer
14a: optical sheet
20: quantum dot layer (optical wavelength conversion layer)
20a: casting film
22: laminated film (front surface side protective film)
24: laminated film (back surface side protective film)
30: partition wall
32: storage chamber
34: light emitter (wavelength converter)
50: manufacturing equipment (manufacturing device of optical wavelength conversion sheet)
52: forming device (forming step)
54: first feed roller
54a, 54b: transport roller
56: first casting die
58: shape-imparting roller
58a: ultraviolet light source
58b, 58c: transport roller
60: second casting die
62: second feed roller
62a: transport roller
64: layering roller
64a: ultraviolet light source
64b: transport roller
70: inspection device (inspection step, primary inspection device, primary inspection step)
72: irradiation mechanism (irradiating step)
74: imaging mechanism (imaging step)
76: imaging wavelength selection mechanism (imaging wavelength selection step)
78: light source
80: camera
82: filter
90: winding roller
100: manufacturing equipment (manufacturing device of optical wavelength conversion sheet)

110: inspection device (secondary inspection device, secondary inspection step)
112: secondary irradiation mechanism
114: secondary imaging mechanism
116: light source
118: camera
P1, P2, P3: captured image (primary captured image)
P10, P20, P30: captured image (secondary captured image)

What is claimed is:

1. An inspection method for an optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the inspection method comprising:
   an irradiating step of irradiating a back surface of the optical wavelength conversion sheet with illumination light including the light in the first wavelength range;
   an imaging step of imaging an optical wavelength conversion sheet from a front surface side of the optical wavelength conversion sheet;
   an imaging wavelength selection step of separating, between the irradiating step and the imaging step, light from the optical wavelength conversion sheet into the light in the first wavelength range and light in a wavelength range other than the first wavelength range, and selecting the light in a wavelength range other than the first wavelength range as light for imaging and emitting the light toward the imaging step;
   a primary inspection step including the irradiating step, the imaging step, and the imaging wavelength selection step; and
   a secondary inspection step including a secondary irradiating step of irradiating the back surface of the optical wavelength conversion sheet with illumination light including the light in the first wavelength range and the light in the second wavelength range, and a secondary imaging step of imaging a light from the optical wavelength conversion sheet from the front surface side of the optical wavelength conversion sheet.

2. The inspection method for an optical wavelength conversion sheet according to claim 1,
   wherein a plurality of storage chambers are formed in the optical wavelength conversion layer by partitioning the optical wavelength conversion layer with a partition wall perpendicular to a layer surface, and
   the optical wavelength converters are enclosed in each of the storage chambers.

3. The inspection method for an optical wavelength conversion sheet according to claim 1,
   wherein, in the optical wavelength conversion sheet, a support layer is provided on a back surface side of the optical wavelength conversion layer.

4. The inspection method for an optical wavelength conversion sheet according to claim 3,
   wherein a back surface of the support layer is covered and protected by a back surface protective film.

5. The inspection method for an optical wavelength conversion sheet according to claim 1,
   wherein, in the optical wavelength conversion sheet, a transparent optical layer is provided on a front surface side of the optical wavelength conversion layer.

6. The inspection method for an optical wavelength conversion sheet according to claim 5,
   wherein a front surface of the optical layer is covered and protected by a front surface protective film.

7. The inspection method for an optical wavelength conversion sheet according to claim 1,
   wherein the first wavelength range is included in a visible light wavelength range.

8. The inspection method for an optical wavelength conversion sheet according to claim 1, comprising:
   a comparison step of comparing a primary captured image imaged in the primary inspection step and a secondary captured image imaged in the secondary inspection step.

9. An inspection device for an optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the inspection device comprising:
   an irradiation mechanism of irradiating a back surface of the optical wavelength conversion sheet with illumination light including the light in the first wavelength range;
   an imaging mechanism of imaging an optical wavelength conversion sheet from a front surface side of the optical wavelength conversion sheet;
   an imaging wavelength selection mechanism of separating, in the optical wavelength conversion sheet and the imaging mechanism, the light in the first wavelength range and light in a wavelength range other than the first wavelength range, and selecting the light in a wavelength range other than the first wavelength range as light for imaging and emitting the light toward the imaging mechanism;
   a primary inspection mechanism including the irradiating mechanism, the imaging mechanism, and the imaging wavelength selection mechanism; and
   a secondary inspection mechanism including a secondary irradiating mechanism of irradiating the back surface of the optical wavelength conversion sheet with illumination light including the light in the first wavelength range and the light in the second wavelength range, and a secondary imaging mechanism of imaging a light from the optical wavelength conversion sheet from the front surface side of the optical wavelength conversion sheet.

10. A manufacturing method for an optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the manufacturing method comprising:
    a forming step of forming the optical wavelength conversion layer; and
    an inspection step of inspecting an optical wavelength conversion sheet on which the optical wavelength conversion layer is formed,
    wherein the inspection step includes:
      an irradiating step of irradiating a back surface of the optical wavelength conversion sheet with illumination light including the light in the first wavelength range;
      an imaging step of imaging an optical wavelength conversion sheet from a front surface side of the optical wavelength conversion sheet;

an imaging wavelength selection step of separating, between the irradiating step and the imaging step, light from the optical wavelength conversion sheet into the light in the first wavelength range and light in a wavelength range other than the first wavelength range, and selecting the light in a wavelength range other than the first wavelength range as light for imaging and emitting the light toward the imaging step;

a primary inspection step including the irradiating step, the imaging step, and the imaging wavelength selection step; and a secondary inspection step including a secondary irradiating step of irradiating the back surface of the optical wavelength conversion sheet with illumination light including the light in the first wavelength range and the light in the second wavelength range, and a secondary imaging step of imaging a light from the optical wavelength conversion sheet from the front surface side of the optical wavelength conversion sheet.

11. A manufacturing device for an optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the manufacturing device comprising:

a forming device for forming the optical wavelength conversion layer; and an inspection device for inspecting an optical wavelength conversion sheet on which the optical wavelength conversion layer is formed, wherein the inspection device includes:
an irradiation mechanism of irradiating a back surface of the optical wavelength conversion sheet with illumination light including the light in the first wavelength range;

an imaging mechanism of imaging an optical wavelength conversion sheet from a front surface side of the optical wavelength conversion sheet;

an imaging wavelength selection mechanism of separating, in the optical wavelength conversion sheet and the imaging mechanism, the light in the first wavelength range and light in a wavelength range other than the first wavelength range, and selecting the light in a wavelength range other than the first wavelength range as light for imaging and emitting the light toward the imaging mechanism;

a primary inspection mechanism including the irradiating mechanism, the imaging mechanism, and the imaging wavelength selection mechanism; and a secondary inspection mechanism including a secondary irradiating mechanism of irradiating the back surface of the optical wavelength conversion sheet with illumination light including the light in the first wavelength range and the light in the second wavelength range, and a secondary imaging mechanism of imaging a light from the optical wavelength conversion sheet from the front surface side of the optical wavelength conversion sheet.

12. A manufacturing method for an optical wavelength conversion sheet having an optical wavelength conversion layer that contains an optical wavelength converter which emits, by receiving light in a first wavelength range, light in a second wavelength range having a peak wavelength different from a peak wavelength of the light in the first wavelength range, the manufacturing method comprising:

a forming step of forming the optical wavelength conversion layer;

an inspection step of inspecting an optical wavelength conversion sheet on which the optical wavelength conversion layer is formed; and a removal step of removing a defective portion detected in the inspection step from a portion used as a product, wherein the inspection step includes:
an irradiating step of irradiating a back surface of the optical wavelength conversion sheet with illumination light including the light in the first wavelength range;

an imaging step of imaging an optical wavelength conversion sheet from a front surface side of the optical wavelength conversion sheet;

an imaging wavelength selection step of separating, between the irradiating step and the imaging step, light from the optical wavelength conversion sheet into the light in the first wavelength range and light in a wavelength range other than the first wavelength range, and selecting the light in a wavelength range other than the first wavelength range as light for imaging and emitting the light toward the imaging step;

a defective portion candidate detection step of detecting candidates for the defective portion using the captured image obtained in the imaging step; and a defective portion specifying step of specifying a portion to be detected as the defective portion from the candidates for the defective portion, and in the defective portion specifying step, in a case where the optical wavelength conversion sheet is irradiated from a back surface side with illumination light including the light in the first wavelength range and observed from a front surface side, a portion to be different in luminance from surrounding portions, which is determined by visual observation, is specified as the defective portion.

13. The manufacturing method for an optical wavelength conversion sheet according to claim 12,
wherein, in the defective portion specifying step, the defective portion is specified by assuming a portion with a brightness of 135% or more relative to a brightness of the surrounding portions as the portion to be different in luminance from surrounding portions, which is determined by visual observation.

14. An optical wavelength conversion sheet manufactured by the manufacturing method for an optical wavelength conversion sheet according to claim 12.

15. The optical wavelength conversion sheet according to claim 14,
wherein a support layer is provided on a back surface side of the optical wavelength conversion layer.

16. The optical wavelength conversion sheet according to claim 14,
wherein a plurality of storage chambers are formed in the optical wavelength conversion layer by partitioning the optical wavelength conversion layer with a partition wall perpendicular to a layer surface.

17. A backlight device for a liquid crystal panel, comprising:
the optical wavelength conversion sheet according to claim 14.

18. A liquid crystal panel comprising:
the optical wavelength conversion sheet according to claim 14.

19. A liquid crystal display device comprising:
the optical wavelength conversion sheet according to claim 14;
a liquid crystal panel; and
a backlight device.

* * * * *